United States Patent [19]
Furlani et al.

[11] Patent Number: 5,659,805
[45] Date of Patent: Aug. 19, 1997

[54] CAMERA FOR INDICATING CAMERA ORIENTATIONS ON PHOTOGRAPHIC FILM

[75] Inventors: Edward P. Furlani, Lancaster; Robert C. Bryant, Honeoye Falls; Bijan Barzideh, Rush, all of N.Y.

[73] Assignee: Eastman Kodak Company, Rochester, N.Y.

[21] Appl. No.: 602,194

[22] Filed: Feb. 16, 1996

[51] Int. Cl.$^6$ .................................................. G03B 17/00
[52] U.S. Cl. ................................................................ 396/50
[58] Field of Search ....................... 354/106; 324/207.2, 324/207.21, 207.23; 396/50

[56] References Cited

U.S. PATENT DOCUMENTS

| | | | |
|---|---|---|---|
| 3,552,283 | 1/1971 | Babcock et al. | |
| 4,183,645 | 1/1980 | Ohmura et al. | 354/106 |
| 4,302,088 | 11/1981 | Vezie | 354/107 |
| 4,402,142 | 9/1983 | Dinsmore | 33/348 |
| 4,585,282 | 4/1986 | Bosley | 308/10 |
| 4,957,274 | 9/1990 | Hood et al. | 251/129.12 |
| 5,021,820 | 6/1991 | Robison et al. | 355/40 |
| 5,042,179 | 8/1991 | Van Der Meer | 38/77.83 |
| 5,157,841 | 10/1992 | Dinsmore | 33/361 |
| 5,270,755 | 12/1993 | Ohno et al. | 354/106 |
| 5,305,787 | 4/1994 | Thygesen | 137/527 |
| 5,499,074 | 3/1996 | Ohsawa et al. | 354/402 |
| 5,541,697 | 7/1996 | McIntyre | 354/289.11 |

*Primary Examiner*—Safet Metjahic
*Assistant Examiner*—John Chizmar
*Attorney, Agent, or Firm*—Peyton C. Watkins

[57] ABSTRACT

A camera for containing film which captures an image and indication of camera orientations thereon, the camera has a camera housing having a magnet rotatably connected to it for rotating the magnet in response to orientations of the camera housing. A first, second and third sensor are attached to the camera body for sensing a magnetic field from the magnet. An electrical circuit generates a logic table which indicates orientations of the camera housing in response to a signal from the first, second and third sensors. A record head indicates on the film the orientation of the camera derived from the logic table.

6 Claims, 4 Drawing Sheets

| SENSOR INPUT | | | | OUTPUT POSITION | | | |
|---|---|---|---|---|---|---|---|
| SENSOR 90A | SENSOR 90B | SENSOR 90C | | UPWARD HORIZONTAL | UPWARD VERTICAL | UPSIDE-DOWN HORIZONTAL | UPSIDE-DOWN VERTICAL |
| 1 | 1 | 1 | | 1 | 0 | 0 | 0 |
| 1 | 1 | 0 | | 0 | 1 | 0 | 0 |
| 0 | 1 | 1 | | 0 | 0 | 1 | 0 |
| 1 | 0 | 1 | | 0 | 0 | 0 | 1 |
| 0 | 0 | 0 | | NOT AVAILABLE | | | |
| 0 | 0 | 1 | | | | | |
| 0 | 1 | 0 | | | | | |
| 1 | 0 | 0 | | | | | |

CAMERA FOR INDICATING CAMERA ORIENTATIONS ON PHOTOGRAPHIC FILM

FIELD OF THE INVENTION

The invention relates generally to the field of photographic cameras containing film for capturing a plurality of images and, more particularly, to such cameras which capture both the images and the camera orientation associated with each image.

BACKGROUND OF THE INVENTION

In conventional photographic film applications, a camera contains a roll of light sensitive photographic film having a predetermined number of exposures which are selectively exposed to incident light for capturing an image to each exposure. The exposed film is processed by a photofinisher for creating photographic prints from the exposed film, and also for converting the exposed film into non-light sensitive negatives, as is well known in the art.

During the photofinishing process, the film is processed by a photofinishing device that implements an algorithm for enhancing the color content of each image. The algorithm assumes each image is captured with the camera in the normal, upright position, and as a result of this assumption, further assumes that darker colors are prevalent at one portion and lighter colors prevalent at another portion.

Although the presently known and utilized system for capturing images is satisfactory, it is not without drawbacks. Images are sometimes captured with the camera not positioned in the normal, upright position. These images may be somewhat grainy or slightly distorted because the darker and lighter colors may not be located as assumed by the algorithm.

Consequently, a need exists for improvements in the construction of camera so as to overcome the above-described drawbacks.

SUMMARY OF THE INVENTION

The present invention is directed to overcoming one or more of the problems set forth above. Briefly summarized, according to one aspect of the present invention, the invention resides in a camera for containing film which captures both an image and an indication of camera orientations thereon, the camera comprising(a) a camera housing; (a) a rotatable magnet disposed within said camera housing for rotating in response to orientations of said camera housing; (c) a first, second and third sensor attached to said camera body for sensing a magnetic field from said magnet; (d) an electrical circuit for generating a logic table which indicates orientations of said camera housing in response to a signal from said first, second and third sensors; and (e) a record head for indicating on the film the orientation of said camera.

It is an object of the present invention to provide a camera which indicates camera orientation on the film.

It is an advantage of the present invention to provide a device for indicating camera orientation on the film which may be retrofitted onto existing cameras.

It is a feature of the present invention to provide a magnet rotatably connected to the camera housing for rotating in response to orientations of the camera housing.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

Figure 1A:
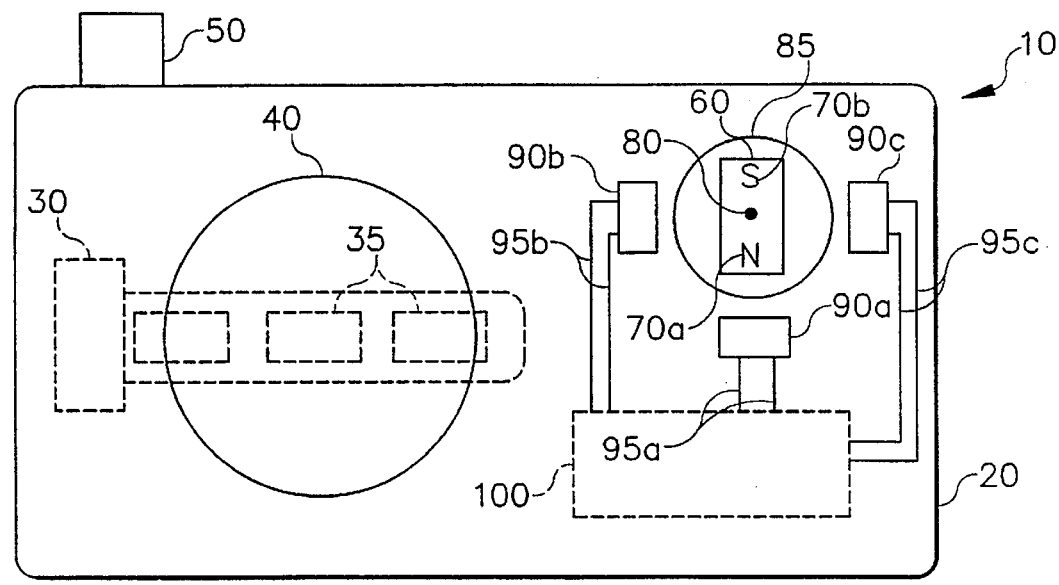
FIG. 1A is a front view of a photographic camera of the present invention positioned in an upward horizontal position.

Referring to FIG. 1A, there is illustrated a front view of a photographic camera 10 having a box-shaped camera housing 20 for containing a roll of removable photographic film 30. A hinged back portion (not shown) of the housing 20, which is closed during normal operation, is opened for inserting and removing the film 30 that includes a plurality of exposures 35 for capturing an image on each exposure 35. A lens 40 is disposed in a receptacle of the camera housing 20 for permitting incident light to enter the camera housing 20 and contacting the film 30. A manually depressable shutter button 50 is pressed for controlling a retractable shutter (not shown) positioned in the lens 40 which, in turn, controls the amount of light which passes through the lens 40 for capturing the image.

A pivotable, bipolar magnet 60, which obviously includes a north 70a and south pole 70b, is attached via a pin 80 to the camera housing 20. The magnet 60 is pivotably rotatable about the pin 80 for permitting 360 degree rotation of the magnet 60. This permits the north pole 70a, which is preloaded by any suitable means so that it is heavier in weight than the south pole 70b, to be acted upon by gravity so that it is positioned closer to the earth's surface than the south pole 70b regardless of the camera orientation. It is obvious to those skilled in the art that if the preloading of the north 70a and south poles 70b is reversed (i.e., the south pole 70b is heavier), then the south pole 70b would be closer to the earth's surface as the camera 10 is manually rotated. In this case, a logic table, described below in detail, will be re-configured which re-configuration will be obvious to those skilled in the art.

Figures 1B, 5:
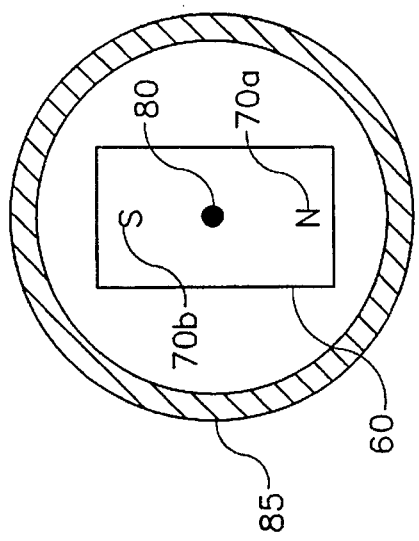
FIG. 1B is an exploded view of a portion of FIG. 1A.
FIG. 5 is a chart illustrating a logic table of the present invention.

As best illustrated in FIG. 1B, a circular-shaped, electrical conductive ring 85 is attached to the camera housing 20 by any suitable means for damping any tendency of the magnet 60 to oscillate after the camera 10 is re-oriented between different positions, as described in detail below. The ring 85 is preferably made of copper or aluminum, although any conductive material may be used.

Referring back to FIG. 1A, three sensors 90a, 90b and 90c are rigidly attached to the camera housing 20 by any suitable means and are substantially spaced apart in 90 degree increments for sensing the magnetic field of the magnet 60. A type of sensor 90 particularly well suited for the present invention is a digital Hall Effect transducer such as those produced by Alegro Microsystems of Worchester, Mass. Such a sensor is an electronic device operative to produce an electric voltage of fixed magnitude, zero volt in the preferred embodiment, as long as it senses a magnetic field of a predetermined polarity—a south pole in the preferred embodiment—higher than a predetermined field strength, hereinafter referred to as a threshold; otherwise it produces five volts. It is instructive to note that five volts corresponds to a logical one and zero volt to a logical zero.

The sensors 90 are each electrically connected via leads 95 to a microcontroller 100 which is attached to the interior of the camera housing 20 by any suitable means, and which interprets the signals from the sensors 90 for determining the camera orientation, as described in detail below. As previously stated, the microcontroller 100 is preferably electrically programmed to either output five volts (logical one) or zero volt (logical zero), although those skilled in the art will readily recognize that other voltages may be implemented for achieving the same result. In this regard, the microcontroller 100 outputs a signal of five volts for that particular sensor 90 if the sensor 90 does not sense the threshold field strength of the south pole 70b; otherwise, a zero volt is outputted (i.e., a south pole is sensed).

Figure 2:
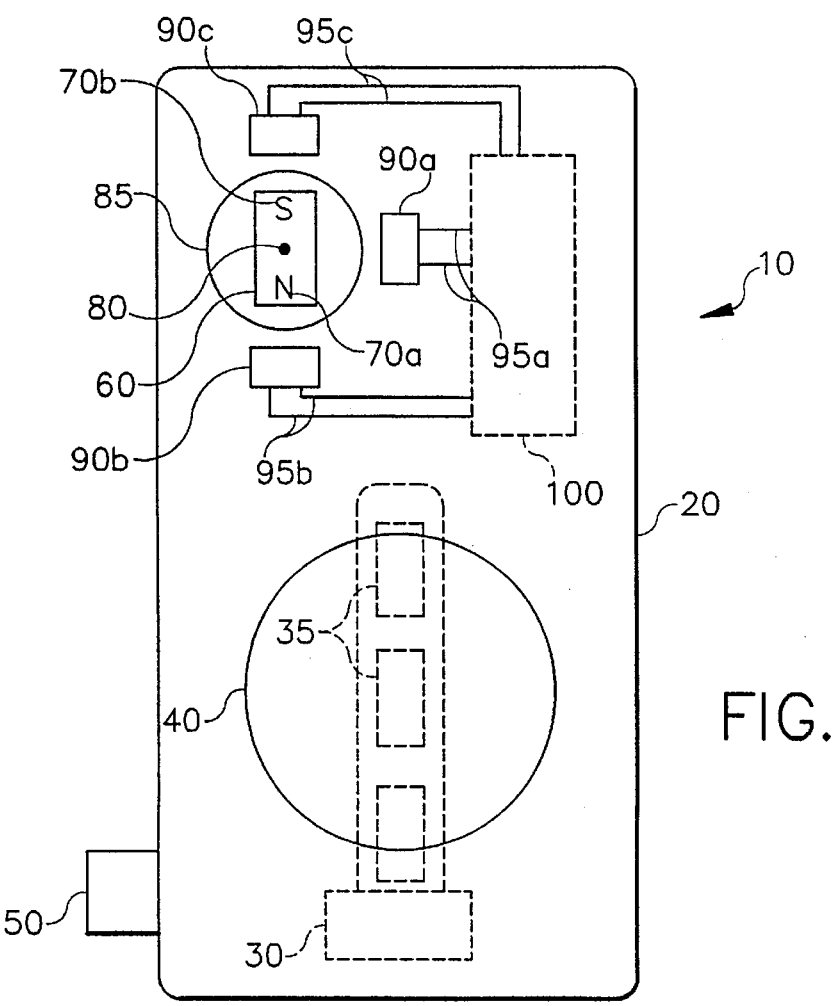
FIG. 2 is a front view of the photographic camera of the present invention positioned in an upward vertical position.

Referring briefly to FIGS. 1A and 5, the camera 10 is in an upward horizontal position and none of the sensors 90 will sense field strength higher than the threshold value. Therefore, each sensor 90 will output five volts or logical one for each sensor Referring briefly to FIGS. 2 and 5, the camera 10 is in an upward vertical position, and only sensor 90c senses the threshold field strength of the south pole 70b causing the microcontroller 100 to respectively output five volts, five volts, and zero volt for sensors 90a, 90b and 90c.

Figure 3:
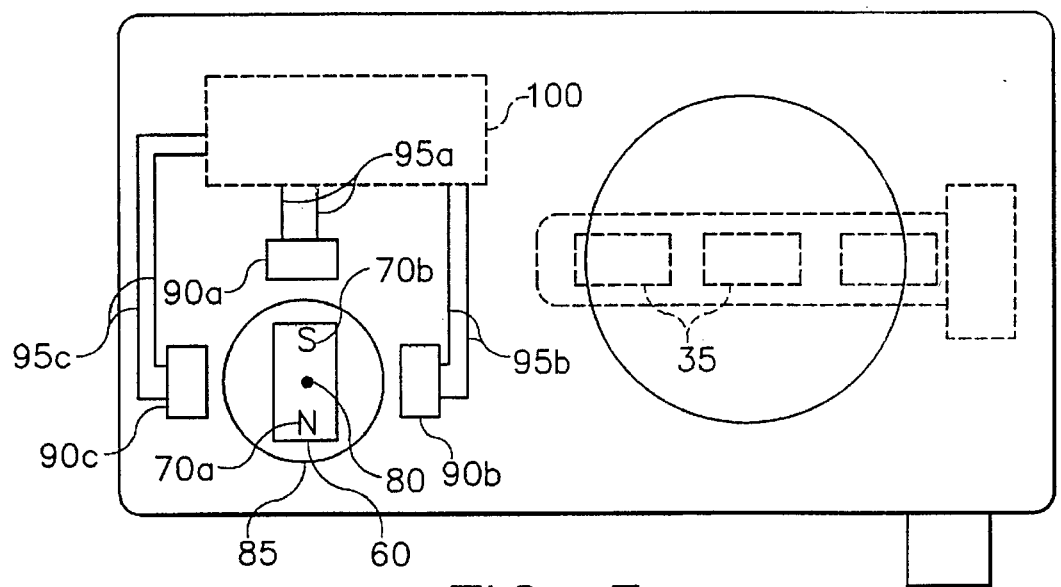
FIG. 3 is a front view of the photographic camera of the present invention positioned in an upside-down horizontal position.

Referring briefly to FIGS. 3 and 5, the camera 10 is an upside-down horizontal position, and only sensor 90a senses the south pole 70b causing the microcontroller 100 to respectively output zero volt, five volts and five volts for sensors 90a, 90b and 90c.

Figure 4:
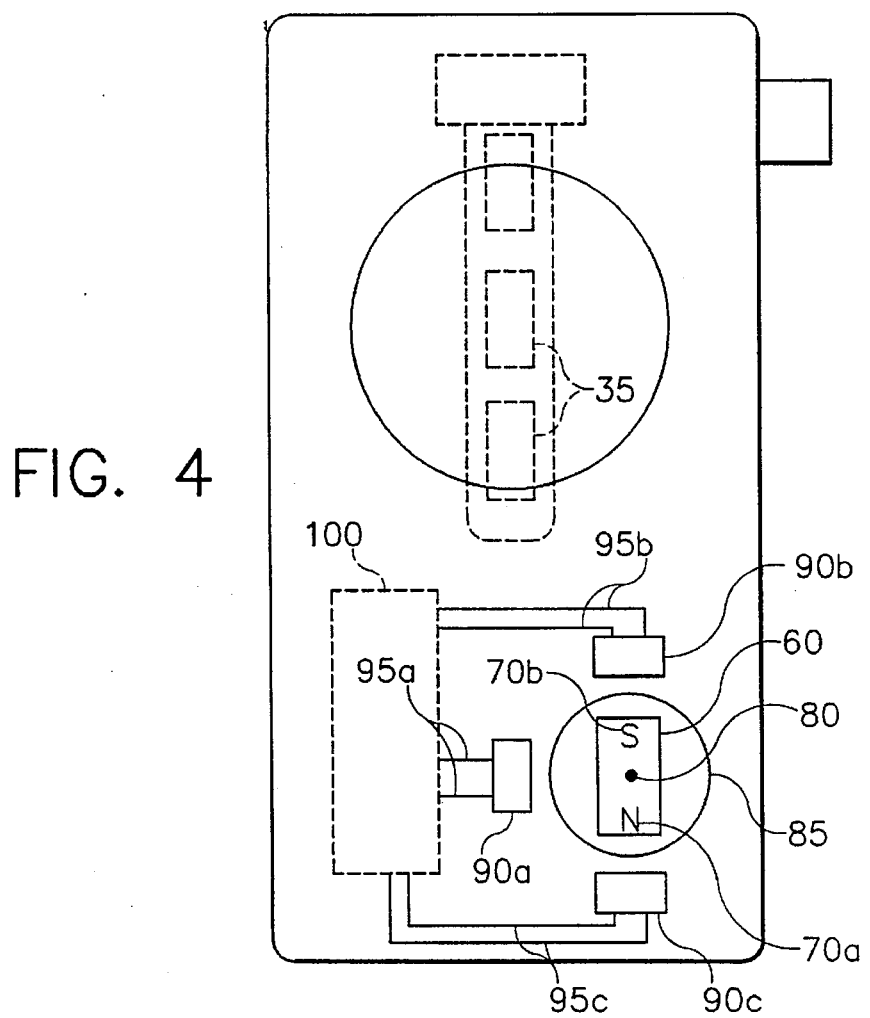
FIG. 4 is a front view of the photographic camera of the present invention positioned in an upside-down vertical position.

Finally, referring to FIGS. 4 and 5, the camera 10 is in an upside-down vertical position, and only sensor 90b senses the south pole 70b causing the microcontroller 100 to respectively output five volts, zero volt and five volts for sensors 90a, 90b and 90c. If the microcontroller 100 receives signals from the sensors 90 having a logic signal designated as not available, the microcontroller 100 is programmed to disregard the signals and to trigger a warning light (not shown) or beeper (not shown) that the sensors 90 are malfunctioning and are in need of repair.

Figure 6:
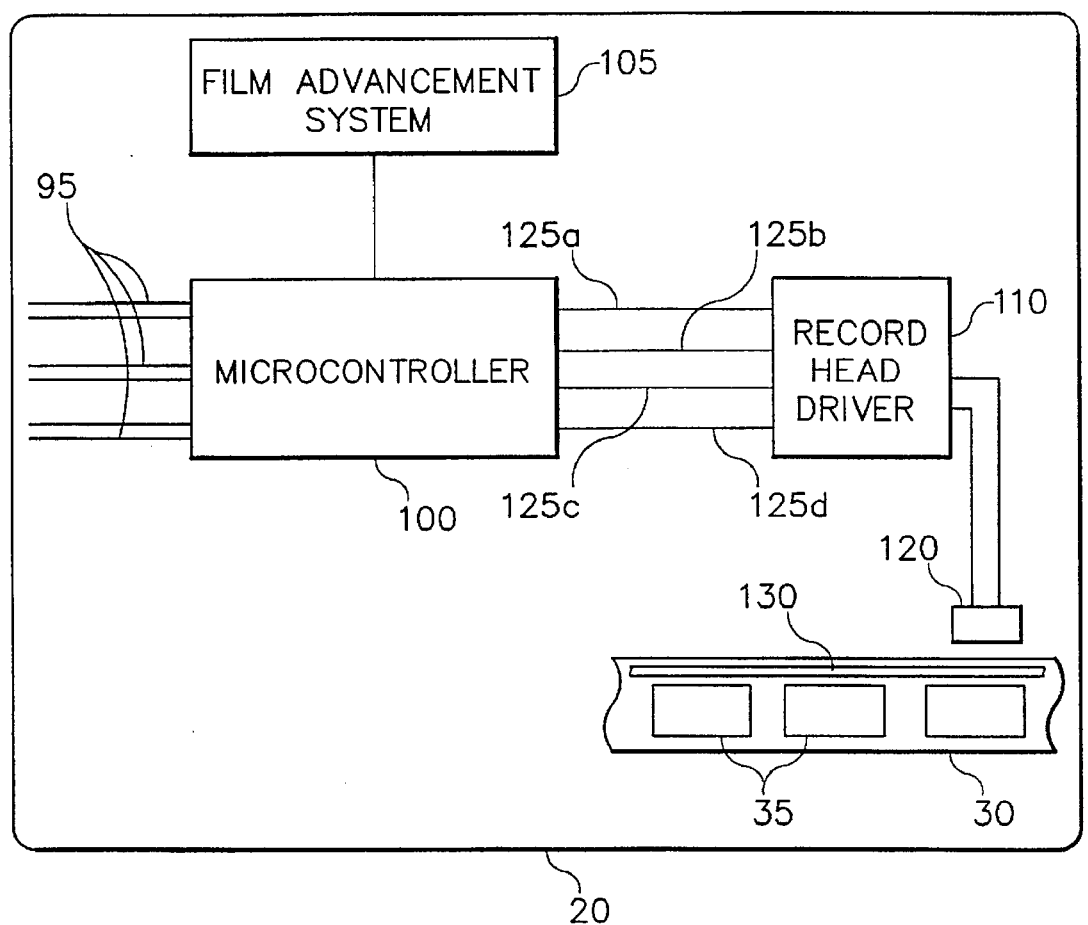
FIG. 6 is a schematic diagram of a system of the present invention for recording the camera orientation on film.

Referring now to FIG. 6, there is illustrated a system contained within the camera housing 20 for transforming the sensor 90 signals indicative of camera orientation onto the film 30. In this regard, the microcontroller 100 sends, via four leads 125, its digital representation of camera orientation to a record head driver 110 which transforms the received signals into a predetermined sequence of voltage or current pulses that are transmitted to the record head 120 which is adjacent to a magnetic recording strip 130 on the film. It facilitates understanding to note that the microcontroller 100 receives a signal from a film advance system 105 indicating that an image is captured, the film 30 is advancing and is ready to have the camera orientation input. This, in turn, signals the microcontroller 100 to output its digital representation of camera orientation. In the preferred embodiment, a logical one received via any lead 125 from the microcontroller 100 causes the record head driver 110 to transform it into five volts, and a logical zero received via any lead 125 from the microcontroller 100 is transformed into zero volt, although those skilled in the art will readily recognize that other voltages may be implemented for conversion for achieving the same result. In response to each five volt input from the record head driver, the record head 120 imparts a magnetic field to a magnetic strip 130 so as to render a magnetized spot on the strip 130 for subsequent readback, as is well known in the art. For each zero volt input from the record head driver 110, the record head 120 withholds outputting a magnetized spot. These spots are placed on the film 30 adjacent its associated captured image.

The recording operation operates as follows. The camera 10 captures an image on an exposure 35 as discussed above and the film is automatically advanced by the film advancement system 105. During this advancement, the record head 120 sequentially outputs its magnetized spots which are sequentially outputted so that the signal from 125a is outputted first, lead 125b is outputted second, lead 125c is outputted third and lead 125d is outputted last. Thus, the digital representation of camera position is recorded as predetermined patterns of magnetic spots on the strip 130 for future decoding, which decoding is well known in the art, during development of the film.

It is instructive to note that after the above-described is completed. The film 30 is correctly positioned for capturing the next image and its associated camera orientation.

The invention has been described with reference to a preferred embodiment. However, it will be appreciated that variations and modifications can be effected by a person of ordinary skill in the art without departing from the scope of the invention.

Parts List:
10 camera
20 housing
30 film
35 exposure
40 lens
50 button
60 magnet
70a north pole
70b south pole
80 pin
85 ring
90 sensor
90a sensor
90b sensor
90c sensor
95 leads
100 microcontroller
105 film advancement system
110 driver
120 head
125 lead
125a lead
125b lead
125c lead
125d lead
130 magnetic strip

We claim:

1. A camera for containing film which captures both an image and an indication of camera orientations thereon, the camera comprising:

(a) a camera housing;

(b) a rotatable magnet disposed within said camera housing for rotating in response to gravity and, consequently, orientations of said camera housing;

(c) first and second sensors attached to said camera body for sensing a magnetic field from said magnet;

(d) an electrical circuit for generating a logic table which indicates orientations of said camera housing in response to a signal from said first and second sensors; and (e) a record head for indicating on the film the orientation of said camera.

2. The camera as in claim 1 further comprising a ring disposed within said camera housing for damping any tendency for the magnet to oscillate.

3. The camera as in claim 2, wherein said electrical circuit includes a microcontroller for generating the logic table.

4. The camera as in claim 2, further comprising a third sensor and wherein said first, second, and third sensors are Hall Effect sensors.

5. The camera as in claim 2, wherein said magnet includes two ends and one end is preloaded to a predetermined weight so that it weighs more than the other end.

6. The camera as in claim 3 further comprising a record head electrically connected to said microprocessor for imparting a coded pattern on the film indicating camera orientation.

* * * * *